US010273848B2

(12) United States Patent
Hogan et al.

(10) Patent No.: US 10,273,848 B2
(45) Date of Patent: Apr. 30, 2019

(54) REDUCTANT DELIVERY SYSTEM

(71) Applicant: Caterpillar Inc., Peoria, IL (US)

(72) Inventors: Keith Daniel Hogan, Peoria Heights, IL (US); Marilyn E. Worley, East Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 314 days.

(21) Appl. No.: 15/264,695

(22) Filed: Sep. 14, 2016

(65) Prior Publication Data

US 2018/0073407 A1    Mar. 15, 2018

(51) Int. Cl.
*F01N 3/20* (2006.01)
*F02B 37/00* (2006.01)
*F01N 11/00* (2006.01)

(52) U.S. Cl.
CPC .............. *F01N 3/206* (2013.01); *F02B 37/00* (2013.01); *F01N 11/002* (2013.01); *F01N 2390/02* (2013.01); *F01N 2610/01* (2013.01); *Y02T 10/144* (2013.01)

(58) Field of Classification Search
CPC .... F01N 3/206; F01N 11/002; F01N 2390/02; F01N 2610/01; F02B 37/00; Y02T 10/144
See application file for complete search history.

(56) References Cited

U.S. PATENT DOCUMENTS

| | | | |
|---|---|---|---|
| 4,429,533 A * | 2/1984 | Dinger | F02B 37/007 60/606 |
| 7,272,924 B2 | 9/2007 | Itoh et al. | |
| 7,765,793 B2 | 8/2010 | Nishiyama et al. | |
| 8,920,757 B1 | 12/2014 | Chandrapati et al. | |
| 2014/0053537 A1 * | 2/2014 | Yan | F01N 3/2066 60/286 |

FOREIGN PATENT DOCUMENTS

| | | |
|---|---|---|
| GB | 2363084 | 12/2001 |
| WO | 2011048292 | 4/2011 |

* cited by examiner

*Primary Examiner* — Brandon D Lee
(74) *Attorney, Agent, or Firm* — Harrity & Harrity LLP

(57) ABSTRACT

A reductant delivery system for an engine system. The engine system includes an engine having an exhaust conduit and a turbocharger with a compressor. The reductant delivery system having an injector, a storage system, a sensor and a controller. The injector is configured to inject a reductant into the exhaust conduit. The storage system stores the reductant and is configured to receive pressurized air from the compressor. The sensor is configured to determine a pressure of the pressurized air in the storage system. The controller is in communication with the sensor and is configured to increase a power output of the engine in response to the pressure being below a desired pressure.

20 Claims, 2 Drawing Sheets

REDUCTANT DELIVERY SYSTEM

TECHNICAL FIELD

The present disclosure relates to a field of exhaust emission control. More particularly, the present disclosure relates to a system and method for a reductant delivery in an exhaust conduit of an engine.

BACKGROUND

Various exhaust emission control technologies are used for treating exhaust gases. One such technology is selective catalytic reduction (SCR). In a typical SCR system a reducing agent is supplied upstream of a catalyst positioned in an exhaust passage, through an injector. The reducing agent reacts with $NO_x$ present in the exhaust gases in the presence of catalyst to convert $NO_x$ to $N_2$ and water. It is important for the reducing agent to be injected at regular intervals for efficient working of the SCR.

Some SCR systems include a pump for supplying the reductant from the reductant storage to the injector, while others utilize pressurized air. SCR systems using pressurized air need a constant supply of pressurized air from an air source. One such air source may be a turbocharger that provides pressurized air to facilitate injection of the reducing agent and is driven by the exhaust gases. In certain instances, like extended engine-idling periods or periods with low engine loading, the amount of exhaust gases is reduced than the amount of exhaust gases produced during periods with normal or high engine loading. Consequently, the turbine of the turbocharger rotates slower and the pressure of the pressurized air discharged by the compressor is reduced. This results in situations where the pressure of the pressurized air does not meet the minimum pressure required for the injection of the reducing agent. Thus, the SCR system is rendered ineffective due to irregular, or no injection of DEF.

U.S. Pat. No. 7,765,793 discloses an exhaust emission control device for controlling a nozzle opening degree of the variable geometry turbocharger based on a result detected by a load detector. If the load detected is in a low load range, the nozzle opening degree is controlled such that the supercharging pressure is at or above a predetermined value at which the reducing agent is atomized. The delivery of reductant is controlled by a dedicated pump, which adds complexity and potential failure points to the system.

SUMMARY OF THE INVENTION

The present disclosure provides for a reductant delivery system for an engine system. The engine system includes an engine having an exhaust conduit and a turbocharger with a compressor. The reductant delivery system includes an injector, a storage system, a sensor, and a controller. The injector is configured to inject a reductant into the exhaust conduit. The storage system stores the reductant and is configured to receive pressurized air from the compressor. The sensor is configured to determine a pressure of the pressurized air in the storage system. The controller is in communication with the sensor. The controller is configured to increase a power output of the engine in response to the pressure being below a desired pressure.

The present disclosure further provides for an engine system. The engine system includes an engine, a turbocharger with a compressor, and a reductant delivery system. The engine includes an intake conduit and an exhaust conduit. The compressor is fluidly coupled to the intake conduit. The reductant delivery system includes an injector, a storage system, a sensor and a controller. The injector is configured to inject a reductant into the exhaust conduit. The storage system stores the reductant and is configured to receive pressurized air from the compressor. The sensor is configured to determine a pressure of the pressurized air in the storage system. The controller is in communication with the sensor. The controller is configured to increase a power output of the engine in response to the pressure being below a desired pressure.

In yet another aspect, a method to deliver a reductant to an exhaust conduit of an engine is disclosed. The method includes providing pressurized air to a storage system from a compressor of a turbocharger. The pressurized air enables delivery of the reductant to an injector located in the exhaust conduit. The method further includes determining a pressure of the pressurized air. The method also includes increasing a power output of the engine to increase the pressure of the pressurized air as a function of a desired pressure.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1:
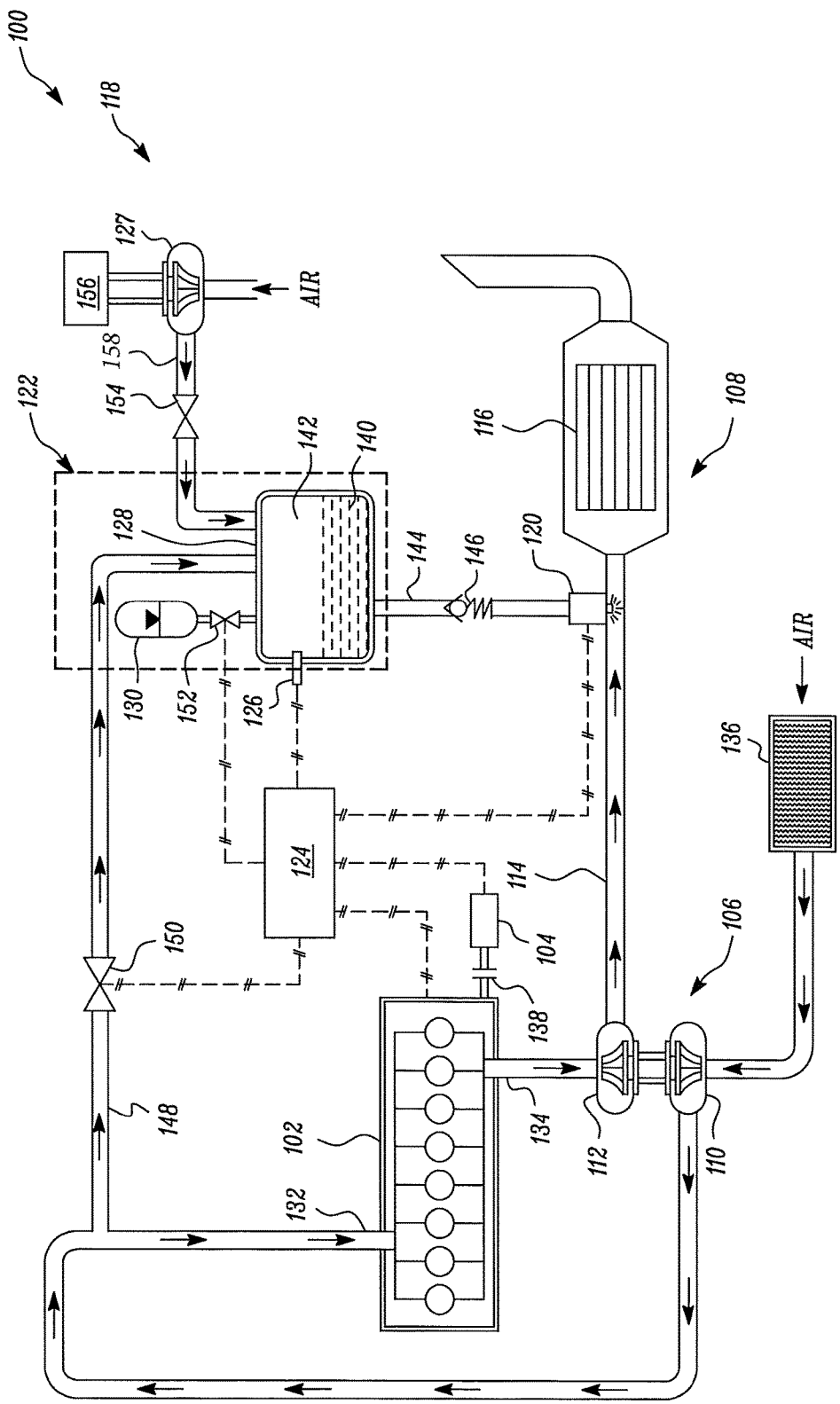
FIG. 1 illustrates a schematic representation of an engine system in accordance with an embodiment.

FIG. 1 illustrates an engine system 100. The engine system 100 includes an engine 102, an auxiliary load 104, a turbocharger 106, and an aftertreatment system 108. The turbocharger 106 further includes a compressor 110 and a turbine 112. In an embodiment, the aftertreatment system 108 further includes a mixing conduit 114, a catalyst 116, and a reductant delivery system 118. The reductant delivery system 118 includes an injector 120, a storage system 122, a controller 124, and a sensor 126. The storage system 122 further includes a reservoir 128 and an accumulator 130.

The engine 102 corresponds to a power generation unit that generates power based on ignition of fuel. The engine 102 may be a two stroke cycle engine, four stroke cycle engine or multiple cycle engine. Further, the engine 102 may be operated on petrol, diesel, gas, methanol, biodiesel or any other suitable fuel. The engine 102 includes an intake manifold and an exhaust manifold. The intake manifold is fluidly coupled to an outlet of the compressor 110 through an intake conduit 132. The exhaust manifold is fluidly coupled to an inlet of the turbine 112 through an exhaust conduit 134. Further, an outlet of the turbine 112 is fluidly coupled to the mixing conduit 114 in the aftertreatment system 108. As discussed, the turbine 112 and the compressor 110 are part of the turbocharger 106. The turbine 112 is coupled to the compressor 110 in such a manner that the turbine 112 drives the compressor 110. For example, when the engine 102 operates, the engine 102 produces exhaust gases that are supplied to the turbine 112 through the exhaust conduit 134. The exhaust gases drive the turbine 112 that in turn drives the compressor 110. The compressor 110 draws the air from the environment through a filter 136, and produces pressurized air. The pressurized air is supplied to the intake manifold of the engine 102 through the intake conduit 132.

The auxiliary load 104 is configured to couple to the engine 102. In an embodiment, the auxiliary load 104 may be a subsystem of a machine. Some examples of auxiliary load 104 may include a hydraulic system, an implement coupled to the machine, any pumps/motors powered by the machine, etc. In an embodiment, the auxiliary load 104 may be a torque converter coupled to the engine 102 and being stalled. The torque converter may be stalled by applying transmission brakes and running the engine 102 at full throttle. Similarly, the auxiliary load 104 may be a hydraulic pump which is being stalled. It may be noted that the auxiliary load 104 may also be an electrical load without deviating from the scope of the present invention. In an embodiment, the auxiliary load 104 may be coupled to the engine 102 via a clutch 138. It may be noted that other mechanisms for connecting or disconnecting the auxiliary load 104 may be used in place of the clutch 138. It may be noted that while a machine (not shown) is performing operations or is in work mode, an additional load may be further added to existing engine loading.

In the aftertreatment system 108, the mixing conduit 114 receives the exhaust gases from the turbine 112. The catalyst 116 is positioned downstream of the mixing conduit 114 and may facilitate reduction of nitrogen oxides (hereinafter referred as $NO_x$). Further, the mixing conduit 114 has the injector 120, of the reductant delivery system 118, positioned upstream of the catalyst 116. The injector 120 is configured to inject a reductant 140 into the mixing conduit 114. In an embodiment, the reductant 140 may be a liquid, a gas or a combination. The reductant 140 may include any substance that is capable of reacting with nitrogen oxides (hereinafter referred as $NO_x$) in presence of the catalyst 116. For the purpose of ongoing description, aqueous urea solution is utilized as the reductant 140 without departing from the scope of the disclosure.

In an embodiment, the injector 120 may receive the reductant 140 from the reservoir 128 of the storage system 122 of the reductant delivery system 118. The reservoir 128 stores the reductant 140 and defines an ullage space 142. The ullage space 142 is the unfilled space in the reservoir 128. The storage system 122 is fluidly coupled to the injector 120 through a first conduit 144 to supply the reductant 140. In an embodiment, the first conduit 144 may include a first valve 146 that is configured to control the flow of the reductant 140 to the injector 120. In an embodiment, the first valve 146 may correspond to a check valve.

The storage system 122 is further fluidly coupled to the intake conduit 132 through a second conduit 148. The storage system 122 receives a portion of the pressurized air supplied from the compressor 110. In an embodiment, the second conduit 148 includes a second valve 150 that controls the flow of the pressurized air to the storage system 122. In an embodiment, the second valve 150 is positioned between the compressor 110 and the reservoir 128 of the storage system 122. When the reservoir 128 receives the portion of pressurized air from the compressor 110, the pressurized air pushes the reductant 140 out of the reservoir 128 to the injector 120.

In an embodiment, the storage system 122 further includes the accumulator 130 that is fluidly coupled to the reservoir 128. The accumulator 130 is configured to receive and store the portion of the pressurized air. In an embodiment, the pressurized air may be supplied to the reservoir 128 from the accumulator 130. The flow of the pressurized air from the accumulator 130 may be controlled through a third valve 152 positioned between the accumulator 130 and the reservoir 128. In an embodiment, the accumulator 130 may be a piston type, bladder type, spring type, weight loaded type or any other suitable accumulator. In an embodiment, the accumulator 130 may be omitted.

The reductant delivery system 118 further includes the controller 124 and the sensor 126. The sensor 126 may be positioned in the reservoir 128 of the storage system 122. In an embodiment, the sensor 126 may be positioned in the second conduit 148 upstream of the reservoir 128. Further, the sensor 126 may be positioned downstream of the second valve 150. In a scenario, where the storage system 122 includes the accumulator 130, the sensor 126 may be positioned either in the reservoir 128, the accumulator 130, or in both of them. In an embodiment, the sensor 126 is configured to determine a pressure of the pressurized air in the storage system 122. The sensor 126 may be a digital or analog sensor and may include devices that are capable of measuring pressure. The sensor 126 may be communicatively coupled with the controller 124. In an embodiment, the sensor 126 may communicate the measured pressure to the controller 124 for further processing. The controller 124 may be a microprocessor based device capable of processing any input received therein. The controller 124 may correspond to an engine control unit (ECU) of the engine 102. In an embodiment, the controller 124 may be an independent controller. The operation of the controller 124 has been described in conjunction with FIG. 2.

In an embodiment, the storage system 122 may be provided pressurized air by an air compressor 127 based on an input from an operator. The input is a manual input provided by a human operator. The air compressor 127 may selectively couple to the reservoir 128 of the storage system 122. The flow of the pressurized air to the storage system 122 may be controlled through a fourth valve 154. The air compressor 127 may be operatively coupled to and driven by a power source 156. The air compressor 127 may be connected to the reservoir 128 via a conduit 158 that is separate from the conduit 148.

INDUSTRIAL APPLICABILITY

Figure 2:
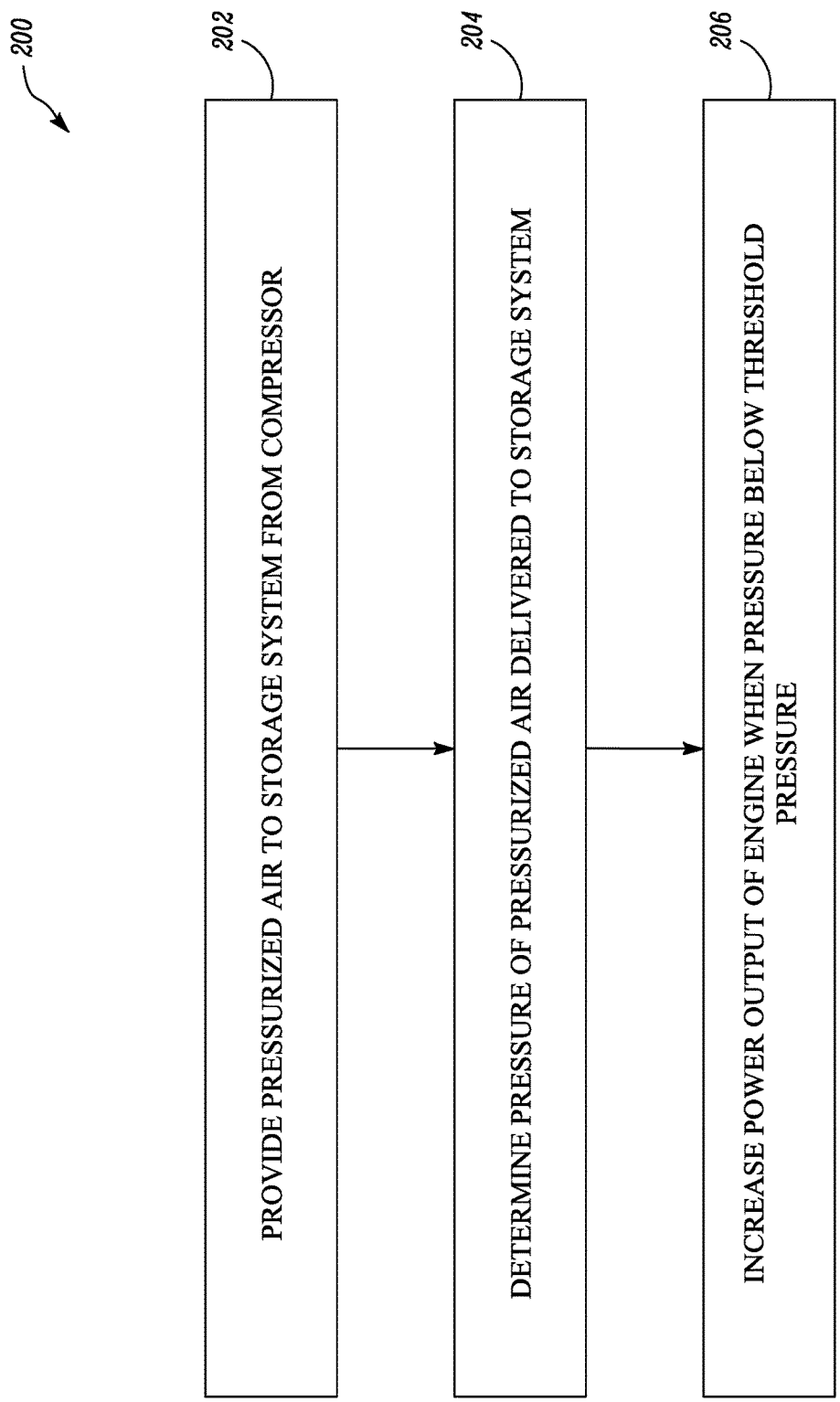
FIG. 2 is a flow chart illustrating a method to deliver a reductant in accordance with an embodiment.

FIG. 2 is a flowchart 200 illustrating a method of delivering the reductant 140 to the mixing conduit 114, in accordance with an embodiment of the present disclosure. The flowchart 200 has been described in conjunction with FIG. 1.

At step 202, the pressurized air is provided to the storage system 122. In an embodiment, the controller 124 is configured to actuate the second valve 150 that facilitates the flow of the pressurized air from the compressor 110 to the storage system 122. Prior to actuating the valve, the engine 102 is operated to generate power that may be utilized to drive one or more equipment coupled to the engine 102. In the process of operation of the engine 102, the exhaust gases are generated. The exhaust gases are supplied to the turbine 112 of the turbocharger 106. The exhaust gases cause the turbine 112 to rotate which in turn causes the compressor 110 to rotate. The compressor 110 draws and compresses the air from the environment to generate pressurized air. The compressor 110 supplies the pressurized air to the engine 102 through the intake conduit 132. Further, the portion of the pressurized air is directed in the second conduit 148. Thereafter, the controller 124 actuates the second valve 150 in such a manner that the pressurized air is supplied to the storage system 122.

In an embodiment, where the accumulator 130 is coupled to the reservoir 128, the pressurized air from the compressor 110 is supplied to the accumulator 130. In an embodiment, the pressurized air from the compressor 110 is supplied to both the accumulator 130 and the reservoir 128. The accumulator 130 may store the received pressurized air for later use. The accumulator 130 may supply the stored pressurized air to the reservoir 128 when the third valve 152 is actuated by the controller 124.

In an embodiment, the storage system 122 is provided pressurized air by the air compressor 127 upon receiving the input from the operator. When the input is provided by the operator, the power source 156 and the fourth valve 154 are activated simultaneously. When activated, the power source 156 starts driving the air compressor 127 and pressurized air is generated. The pressurized air is then provided to the storage system 122 through the fourth valve 154.

At step 204, the pressure of the pressurized air in the storage system 122 is determined. In an embodiment, the controller 124 opens the second valve 150 and the portion of the pressurized air flows to the storage system 122. In an embodiment, the sensor 126 determines the pressure of the pressurized air in the reservoir 128 of the storage system 122 and communicates the pressure to the controller 124.

At step 206, the power output of the engine 102 is increased as a function of a desired pressure. In an embodiment, the controller 124 receives the determined pressure of the pressurized air from the sensor 126. The controller 124 then compares the determined pressure of the pressurized air to the desired pressure. If the determined pressure of the pressurized air is below the desired pressure, the controller 124 increases the power output of the engine 102. The controller 124 increases the power output by coupling the auxiliary load 104 to the engine 102. The controller 124 sends signal to the auxiliary load 104 to start working, thereby increasing load on the engine 102. The increased load on the engine 102 increases the exhaust gases, thereby increasing the speed of the compressor 110. The increased speed of the compressor 110 increases the pressure of the pressurized air being delivered to the storage system 122. In an embodiment, the step 206 is repeated until the determined pressure by the sensor 126 becomes above the desired pressure. Therefore, the chances of irregular or no injection of the reductant 140 is avoided. This improves the working of the aftertreatment system 108.

In an embodiment, the accumulator 130 is coupled to the second conduit 148 and the determined pressure of the pressurized air is below the desired pressure. The controller 124 actuates the third valve 152 for allowing flow of the stored pressurized air from the accumulator 130 to the reservoir 128 of the storage system 122. Therefore, the accumulator 130 limits the frequency of coupling the auxiliary load 104 to the engine 102 for increasing the pressure of the pressurized air.

What is claimed is:

1. A system comprising:
   a turbocharger that includes a first compressor;
   a second compressor;
   an injector configured to inject a reductant into an exhaust conduit of an engine;
   a storage system that includes a reservoir,
     the reservoir being configured to:
       store the reductant, and
       receive pressurized air from the first compressor and the second compressor,
       the first compressor being connected to the reservoir via a first conduit, and
       the second compressor being connected to the reservoir via a second conduit that is separate from the first conduit;
   a sensor configured to determine a pressure of the pressurized air in the storage system; and
   a controller, in communication with the sensor, configured to increase a power output of the engine based on the pressure being below a particular level of pressure.

2. The system of claim 1, wherein the power output of the engine is increased by coupling an auxiliary load to the engine.

3. The system of claim 1, wherein the pressurized air received by the storage system enables delivery of the reductant to the injector when the pressure of the pressurized air is above the particular level of pressure.

4. The system of claim 1, further comprising:
   a first valve that is positioned between the first compressor and the storage system; and
   a second valve that is positioned between the second compressor and the storage system.

5. The system of claim 1, wherein the second compressor is an air compressor that provides a portion of the pressurized air to the storage system based on an operator input.

6. The system of claim 1,
   wherein the reservoir includes an ullage space above the reductant, and
   wherein the pressurized air is received in the ullage space.

7. The system of claim 1,
   wherein the storage system further includes an accumulator fluidly coupled to the reservoir, and
   wherein the accumulator is configured to store the pressurized air.

8. An engine system, comprising:
   an engine having an intake conduit and an exhaust conduit;
   a turbocharger that includes a first compressor fluidly coupled to the intake conduit;
   a second compressor; and
   a reductant delivery system that includes:
     an injector configured to inject a reductant into the exhaust conduit;
     a storage system that includes a reservoir,
       the reservoir being configured to receive pressurized air from the first compressor and the second compressor, and
       the first compressor and the second compressor being connected to the reservoir via different conduits;
     a sensor configured to determine a pressure of the pressurized air in the storage system; and
     a controller, in communication with the sensor, configured to increase a power output of the engine based on the pressure.

9. The engine system of claim 8, wherein the power output of the engine is increased by coupling an auxiliary load to the engine.

10. The engine system of claim 8, wherein the pressurized air received by the storage system enables delivery of the reductant to the injector when the pressure of the pressurized air is above a particular level of pressure.

11. The engine system of claim 8, further comprising:
    a valve that controls a flow of a portion of the pressurized air and is positioned between the first compressor and the storage system.

12. The engine system of claim 8, further comprising:
    a valve that controls a backflow of the reductant and is positioned between the storage system and the injector.

13. The engine system of claim 8,
wherein the reservoir includes an ullage space above the reductant, and
wherein the pressurized air is received in the ullage space.

14. The engine system of claim 8,
wherein the storage system further includes an accumulator fluidly coupled to the reservoir, and
wherein the accumulator is configured to store the pressurized air.

15. A method to deliver a reductant to an exhaust conduit of an engine, the method comprising:
providing, via a first conduit and from a first compressor of a turbocharger, first pressurized air to a reservoir of a storage system;
providing, via a second conduit and from a second compressor, second pressurized air to the reservoir,
wherein the second conduit is separate from the first conduit, and
wherein the first pressurized air and the second pressurized air enable delivery of the reductant to an injector located in the exhaust conduit;
determining a pressure of the first pressurized air and the second pressurized air; and
increasing a power output of the engine to increase the pressure as a function of a particular level of pressure.

16. The method of claim 15, wherein increasing the power output comprises coupling an auxiliary load to the engine.

17. The method of claim 15, wherein determining the pressure comprises determining the pressure using a sensor positioned in the reservoir.

18. The method of claim 15, wherein providing the first pressurized air comprises:
storing the first pressurized air into an accumulator of the storage system, and
providing the first pressurized air from the accumulator to the reservoir.

19. The method of claim 15,
wherein the first pressurized air is further provided via a first valve, and
wherein the second pressurized air is further provided via a second valve that is separate from the first valve.

20. The method of claim 15, wherein increasing the power output of the engine comprises:
increasing the power output of the engine by sending signals from a controller to an auxiliary load.

* * * * *